United States Patent
Cai et al.

(10) Patent No.: US 10,992,134 B2
(45) Date of Patent: Apr. 27, 2021

(54) LOAD SHEDDING SYSTEM FOR BOTH ACTIVE AND REACTIVE POWER BASED ON SYSTEM PERTURBATION

(71) Applicant: Schweitzer Engineering Laboratories, Inc., Pullman, WA (US)

(72) Inventors: Niannian Cai, Pullman, WA (US); Abdel Rahman Khatib, Pullman, WA (US); Niraj Kiritkumar Shah, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 146 days.

(21) Appl. No.: 16/409,486

(22) Filed: May 10, 2019

(65) Prior Publication Data
US 2020/0356128 A1    Nov. 12, 2020

(51) Int. Cl.
*H02J 3/14* (2006.01)
*G05F 1/70* (2006.01)
*H02J 3/18* (2006.01)
*H02J 3/16* (2006.01)

(52) U.S. Cl.
CPC .............. *H02J 3/14* (2013.01); *G05F 1/70* (2013.01); *H02J 3/16* (2013.01); *H02J 3/18* (2013.01)

(58) Field of Classification Search
CPC ....................................................... H02J 3/14
USPC ............................................................ 307/31
See application file for complete search history.

(56) References Cited

U.S. PATENT DOCUMENTS

| | | | |
|---|---|---|---|
| 3,849,637 | A | 11/1974 | Caruso |
| 4,916,328 | A | 4/1990 | Culp |
| 5,160,926 | A | 11/1992 | Schweitzer, III |
| 5,436,510 | A | 7/1995 | Gilbert |
| 5,680,324 | A | 10/1997 | Schweitzer, III |
| 5,793,750 | A | 8/1998 | Schweitzer, III |
| 6,121,886 | A | 9/2000 | Andersen |
| 6,204,642 | B1 | 3/2001 | Lawson |

(Continued)

FOREIGN PATENT DOCUMENTS

| | | |
|---|---|---|
| CN | 101545953 | 1/2011 |
| DE | 10200733 | 7/2003 |

(Continued)

OTHER PUBLICATIONS

Mageshvaran et al, "Steady state load shedding to mitigate blackout in power systems using an improved harmony search algorithm", 2015, Ain Shams Engineering Journal, School of Electrical Engineering, VIT University, vol. 6, pp. 819-834 (Year: 2015).*

(Continued)

*Primary Examiner* — Adi Amrany
(74) *Attorney, Agent, or Firm* — Bradley W. Schield

(57) ABSTRACT

The present disclosure relates to shedding loads based on perturbation of active power and perturbation of reactive power. For instance, a method includes receiving electrical measurements of a power system. The method includes detecting a contingency in the power system. The method includes determining perturbation of the active power and perturbation of reactive power in the power system based on the electrical measurements. The method includes shedding one or more loads of the power system due to the contingency based on the perturbation of the active power and the perturbation of reactive power.

20 Claims, 5 Drawing Sheets

(56) References Cited

U.S. PATENT DOCUMENTS

| | | |
|---|---|---|
| 6,380,949 B2 | 4/2002 | Thomas |
| 6,388,901 B2 | 5/2002 | Sato |
| 6,492,801 B1 | 12/2002 | Sims |
| 6,608,635 B1 | 8/2003 | Mumm |
| 6,662,124 B2 | 12/2003 | Schweitzer |
| 6,671,635 B1 | 12/2003 | Forth |
| 6,757,282 B1 | 6/2004 | Ofek |
| 6,795,789 B2 | 9/2004 | Vandiver |
| 6,871,224 B1 | 3/2005 | Chu |
| 6,944,555 B2 | 9/2005 | Blackett |
| 6,947,269 B2 | 9/2005 | Lee |
| 6,957,158 B1 | 10/2005 | Hancock |
| 6,961,641 B1 | 11/2005 | Forth |
| 6,990,395 B2 | 1/2006 | Ransom |
| 7,080,142 B2 | 7/2006 | Galloway |
| 7,174,258 B2 | 2/2007 | Hart |
| 7,188,003 B2 | 3/2007 | Ransom |
| 7,231,003 B2 | 6/2007 | Lee |
| 7,415,368 B2 | 8/2008 | Gilbert |
| 7,415,725 B2 | 8/2008 | Henneberry |
| 7,421,531 B2 | 9/2008 | Rotvold |
| 7,447,760 B2 | 11/2008 | Forth |
| 7,457,872 B2 | 11/2008 | Aton |
| 7,460,347 B2 | 12/2008 | Schweitzer, III |
| 7,460,590 B2 | 12/2008 | Lee |
| 7,463,467 B2 | 12/2008 | Lee |
| 7,666,004 B2 | 2/2010 | Johnson |
| 7,693,607 B2 | 4/2010 | Kasztenny |
| 7,698,233 B1 | 4/2010 | Edwards |
| 7,870,595 B2 | 1/2011 | Finney |
| 7,899,619 B2 | 3/2011 | Petras |
| 7,987,059 B2 | 7/2011 | Gong |
| 8,082,367 B2 | 12/2011 | Etheridge |
| 8,131,383 B2 | 3/2012 | Pearson |
| 8,248,060 B2 | 8/2012 | Schweitzer |
| 8,260,579 B2 | 9/2012 | Bickel |
| 8,604,803 B2 | 12/2013 | Dooley |
| 8,606,372 B1 | 12/2013 | Harris |
| 9,383,735 B2 | 7/2016 | Schweitzer |
| 9,519,301 B2 | 12/2016 | Bartlett |
| 9,568,516 B2 | 2/2017 | Gubba Ravikumar |
| 10,333,301 B2 | 6/2019 | Gubba Ravikumar |
| 2001/0022734 A1 | 9/2001 | Sato |
| 2002/0091503 A1 | 7/2002 | Carrillo |
| 2002/0173927 A1 | 11/2002 | Vandiver |
| 2003/0042876 A1 | 3/2003 | Sadafumi |
| 2003/0088809 A1 | 5/2003 | Gulati |
| 2004/0010350 A1 | 1/2004 | Lof |
| 2004/0124812 A1 | 7/2004 | Delmerico |
| 2004/0138834 A1 | 7/2004 | Blackett |
| 2004/0138835 A1 | 7/2004 | Ransom |
| 2004/0164717 A1 | 8/2004 | Thompson |
| 2004/0193329 A1 | 9/2004 | Ransom |
| 2005/0138111 A1 | 6/2005 | Aton |
| 2005/0138432 A1 | 6/2005 | Ransom |
| 2005/0144437 A1 | 6/2005 | Ransom |
| 2005/0280965 A1 | 12/2005 | Lee |
| 2005/0285574 A1 | 12/2005 | Huff |
| 2006/0155908 A1 | 7/2006 | Rotvold |
| 2006/0230394 A1 | 10/2006 | Forth |
| 2007/0067132 A1 | 3/2007 | Tziouvaras |
| 2007/0096765 A1 | 5/2007 | Kagen |
| 2007/0133724 A1 | 6/2007 | Mazereeuw |
| 2007/0162189 A1 | 7/2007 | Huff |
| 2007/0168088 A1 | 7/2007 | Ewing |
| 2007/0219755 A1 | 9/2007 | Williams |
| 2007/0239372 A1 | 10/2007 | Schweitzer |
| 2007/0239373 A1 | 10/2007 | Nasle |
| 2008/0052435 A1 | 2/2008 | Norwood |
| 2008/0074810 A1 | 3/2008 | Guzman-Casillas |
| 2008/0075019 A1 | 3/2008 | Petras |
| 2008/0162930 A1 | 7/2008 | Finney |
| 2009/0085407 A1 | 4/2009 | Venkatasubramanian |
| 2009/0088990 A1 | 4/2009 | Schweitzer |
| 2009/0254655 A1 | 10/2009 | Kidwell |
| 2010/0204851 A1 | 8/2010 | Yuen |
| 2010/0312414 A1 | 12/2010 | Kumar |
| 2011/0004425 A1 | 1/2011 | Schweitzer |
| 2011/0022245 A1 | 1/2011 | Goodrum |
| 2011/0035065 A1 | 2/2011 | Schweitzer |
| 2011/0054709 A1 | 3/2011 | Son |
| 2011/0066301 A1 | 3/2011 | Donolo |
| 2011/0282507 A1 | 11/2011 | Oudalov |
| 2011/0320058 A1 | 12/2011 | Rietmann |
| 2012/0123602 A1 | 5/2012 | Sun |
| 2012/0226386 A1 | 9/2012 | Kulathu |
| 2012/0232710 A1 | 9/2012 | Warner |
| 2012/0310434 A1 | 12/2012 | Taft |
| 2012/0310559 A1 | 12/2012 | Taft |
| 2013/0030599 A1 | 1/2013 | Milosevic |
| 2013/0035800 A1 | 2/2013 | Kulathu |
| 2013/0035885 A1 | 2/2013 | Sharon |
| 2013/0066480 A1* | 3/2013 | Glavic ............... H02J 3/24 700/295 |
| 2013/0074513 A1 | 3/2013 | Mueller |
| 2013/0166085 A1 | 6/2013 | Cherian |
| 2014/0001847 A1 | 1/2014 | Khandelwal |
| 2014/0100702 A1 | 4/2014 | Schweitzer |
| 2014/0100705 A1 | 4/2014 | Shi |
| 2014/0293494 A1 | 10/2014 | Allen |
| 2014/0316604 A1 | 10/2014 | Ortjohann |
| 2015/0054339 A1 | 2/2015 | Zhao |
| 2015/0077133 A1 | 3/2015 | Fischer |
| 2015/0094871 A1 | 4/2015 | Bhageria |
| 2015/0241894 A1 | 8/2015 | Bartlett |
| 2015/0244170 A1 | 8/2015 | Bartlett |
| 2015/0244171 A1 | 8/2015 | Bartlett |
| 2016/0048150 A1* | 2/2016 | Chiang ............... G05F 1/66 700/295 |
| 2016/0190790 A1 | 6/2016 | Oudalov |
| 2016/0246666 A1 | 8/2016 | Gubba Ravikumar |
| 2017/0077700 A1 | 3/2017 | Sun |
| 2018/0034317 A1* | 2/2018 | Khatib ............... H02J 13/0006 |
| 2018/0323611 A1 | 11/2018 | Gubba Ravikumar |
| 2019/0148941 A1* | 5/2019 | Wang ............... H02J 13/00004 700/287 |
| 2020/0026337 A1* | 1/2020 | Khatib ............... H02J 3/381 |
| 2020/0227915 A1* | 7/2020 | Cai ............... G05B 19/042 |
| 2020/0251926 A1* | 8/2020 | Xia ............... H02J 13/00006 |

FOREIGN PATENT DOCUMENTS

| | | |
|---|---|---|
| EP | 1381132 | 9/2010 |
| WO | 2013017363 | 2/2013 |

OTHER PUBLICATIONS

Carl B. Hauser, David E. Bakken, Anjan Bose, A Failure to Communicate, IEEE Power and Energy Magazine, Mar./Apr. 2005.

Edmund O. Schweitzer, III, David E. Whitehead, Real-Time Power System Control Using Synchrophasors, Sep. 11, 2007.

Edmund O. Schweitzer, III, David E. Whitehead, Real-World Synchrophasor Solutions, Sep. 17, 2008.

John C. Eidson, John Tengdin, IEEE-1588 Standard for a Precision Clock Synchronization Protocol for a Networked Measurement and Control System and Applications in the Power Industry, 2003.

M. Kezunovic, G. Latisko, Automated Monitoring Functions for Impoved Power System Operation and Control, IEEE, 2005.

ScadaWorks, SCADA System Development Tools, Technical Reference Manual, 2003.

W.J. Ackerman, The Impact of IEDs on the Design of Systems Used for Operation and Control of Power Systems, Power System Management and Control, Apr. 17-19, 2002.

Wobshal, Network Sensors for the Smart Grid, Sensors Expo, 2010.

Gao. "Remedial Action Schemes Derived from Dynamic Security Assessment." Mar. 16, 2012. Retrieved from <https://www.diva-portal.org/smash/get/diva2:510598/FULLTEXT01.pdf> entire document.

Madami et al. "Design and Implementation of Wide Area Special Protection Schemes." In: 2004 57th Annual Conference for Protective Relay Engineers. Apr. 1, 2004. Retrieved from <https://www.

(56) References Cited

OTHER PUBLICATIONS gegridsolutions.com/smartgrid/Apr06/Wide_Area_Special_Protection_Schemes.pdf> entire document.

North American Electric Reliability Corporation (NERC). "Special Protection Systems (SPS) and Remedial Actions Schemes (RAS): Assessment of Definition , Regional Practices, and Application of Related Standards." Apr. 2013. Retrieved from <https://www.nerc.com/pa/Stand/Prjct201005_2SpclPrtctnSstmPhs/System_Protection_and_Control_Subcommittee_SPCS_20_SAMS-SPCS_SPS_Technic_02182014.pdf> entire document.

Kai Sun, Da-Zhong Zheng, and Qiang Lu, "Splitting Strategies for Islanding Operation of Large-Scale Power Systems Using OBDD-based methods," in IEEE Transactions on Power Systems, vol. 18, No. 2, pp. 912-923, May 2003.

Mark Grant, "Foxboro SCADA Systems Load Shedding and Electrical Monitoring Control Systems Design in Industrial Process Plants", 2012, retrieved on May 5, 2016 from http://iom.invensys.com/EN/pdfLibrary/WhitePaper_LoadSheddingandElectricalMonitoring.pdf.

\* cited by examiner

LOAD SHEDDING SYSTEM FOR BOTH ACTIVE AND REACTIVE POWER BASED ON SYSTEM PERTURBATION

TECHNICAL FIELD

The present disclosure relates generally to electric power delivery systems and, more particularly, to monitoring and control systems that shed loads based on perturbation of active and reactive power.

BRIEF DESCRIPTION OF THE DRAWINGS

Non-limiting and non-exhaustive embodiments of the disclosure are described herein, including various embodiments of the disclosure with reference to the figures listed below.

DETAILED DESCRIPTION OF SPECIFIC EMBODIMENTS

Figure 1:
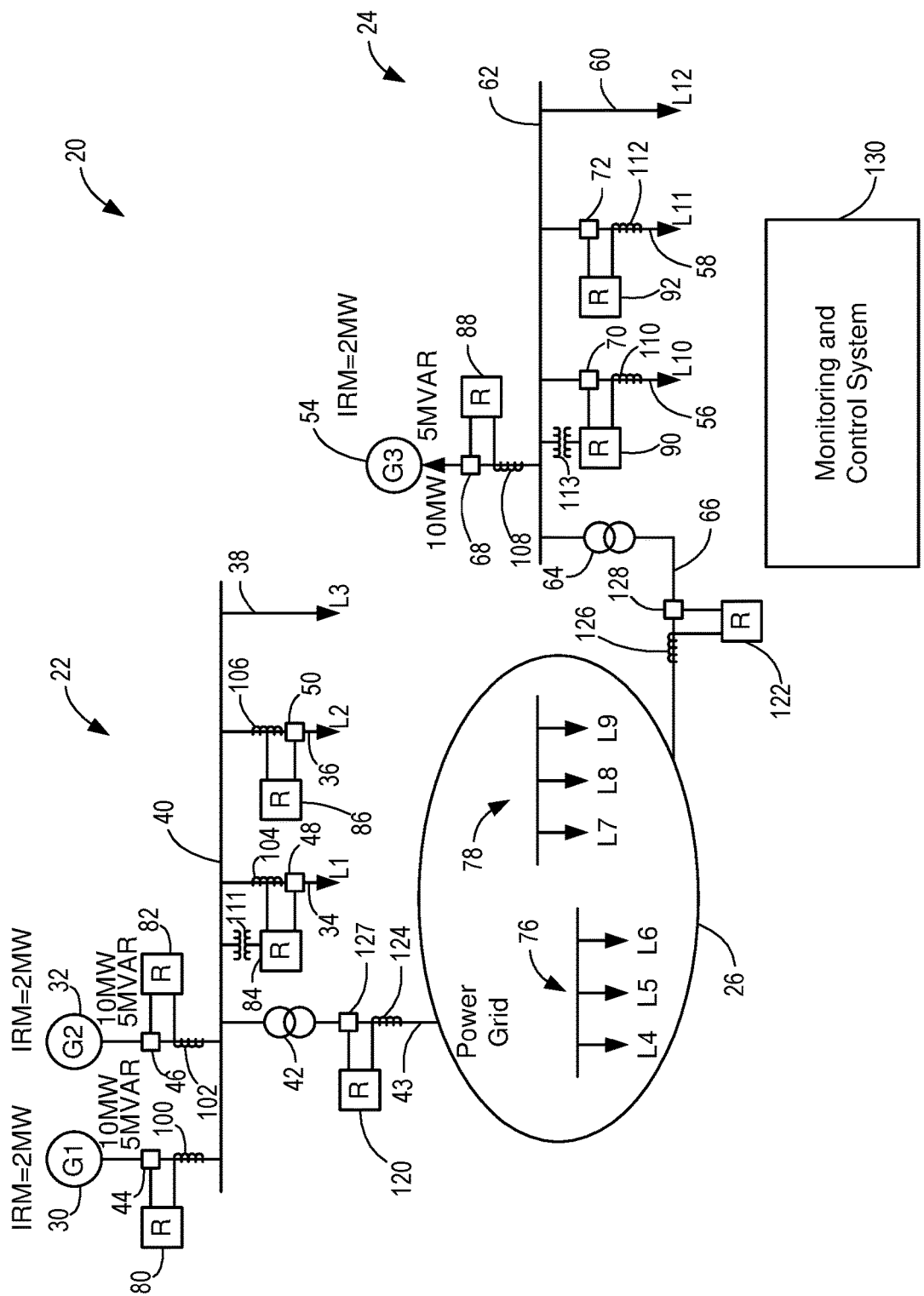
FIG. 1 is a one-line diagram of an electric power delivery system having a monitoring and control system that sheds loads based on perturbation of active power and reactive power, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Electric power delivery systems are used to transmit electric power from generation to load. Monitoring and control systems may be used to monitor the power being delivered and to make control decisions regarding such electric power delivery systems. For example, monitoring and control systems may take one or more control actions upon occurrence of a contingency in the system. A contingency may refer to loss and/or failure of equipment on the electric power delivery system, opening of circuit breakers an overcurrent, overvoltage, or undervoltage protection trips on the electric power delivery system, or the like. These contingencies may be caused by faults, generator failure, transformer failure, or any other event on the power delivery system. In some cases, the contingency may impact the power being generated and/or the power being demanded (e.g., due to a change in topology of the electric power delivery system). Monitoring and control systems may perform control action(s), such as shedding loads, to balance power generation with power demand upon occurrence of the contingency to maintain operation of the electric power delivery system.

Decisions to shed load may be made based on active power being delivered and consumed or the frequency of the current/voltage. For example, if active power being generated and delivered to the loads is less than the active power demands of the loads, one or more loads may be shed from the electric power delivery system to balance active power being generation with active power demand. Further, active power load shedding may take into account prioritization of loads during balancing by presetting load priority in the power delivery system and shedding loads according to priority.

However, making these decisions based on active power, without considering reactive power, may result in voltage variations on the power delivery system. For example, a contingency may cause a system to lose both active and reactive power provided by a generator. Following the loss of the active power and reactive power from the generator, shedding a load to balance active power generation with demand may leave a deficiency or excess of reactive power in the system. Further, the extent of the difference between the reactive power supplied and reactive power demanded may not be known. This difference (e.g., excess or deficiency) between reactive power supplied and reactive power demanded may cause undesirable voltage behaviors. For instance, losing reactive power generation without a corresponding amount of reactive load shedding may cause voltages on one or more buses in the power delivery system to decrease due to a difference between reactive power being demanded and reactive power being delivered. Depending on the extent of the difference (e.g., deficiency/excess) between reactive power supply and reactive power demand, various bus voltages of the electric power delivery system may decrease or increase beyond desired operating limits causing voltage protection trips and/or voltage collapses to occur. As such, not accounting for reactive power may result in outages on the power system.

Moreover, including preset prioritization of loads that account for reactive power in control schemes may be complicated given that different amounts of reactive power and active power may be present depending on the contingency that occurs. Further, frequency may be considered as more global measurement general behavior which may be consistent throughout the power delivery system, whereas bus voltages are a localized measurement that depend on where the generation and loads are occurring. Accordingly, there is a need in the field to account for reactive power to ensure bus voltages stay within desired operating limits while maximizing real power output.

As described below, a monitoring and control system may shed loads of a power delivery system based on perturbation of both active power and reactive power when there is insufficient reactive power generation for the demand, for instance, following an occurrence of a contingency that resulted in losing reactive power generation. Further, by comparing perturbation of active power and reactive power due to the contingency with steady state of the power system prior to the contingency occurring, the systems below may account for reactive power without measuring nonsheddable loads.

The monitoring and control system may use linear optimization to model the power system using an objective function and a set of constraints, such as equality constraints and inequality constraints. In some embodiments, the set of equality constraints may include a piecewise linear approximation of changes in phase angles between the voltages of buses from the perturbation to approximate power flow equations of active power and reactive power. The inequality constraints may include voltage constraints of the buses in the power delivery system. These voltage constraints may be received by the monitoring and control system via user inputs. The inequality constraints may further include active power and reactive power generation constraints based on the operating properties of the generators in the power delivery system. The set of constraints may be used to account for the operating modes of the generators in the power delivery system. For example, the monitoring and control system may include constraints that depend on the active power mode (e.g., isochronous mode, droop mode, constant MW mode) and the reactive power mode (e.g., voltage mode, constant MVAR mode, power factor (PF) mode, voltage droop mode) of a generator. The objective function may include a function that minimizes the active power loads tripped after a contingency while accounting for load priority (e.g., using a weight factor). By shedding loads based on perturbation of both active power and reactive power, the monitoring and control system may protect the power delivery system from changes in bus voltages that violate operating limits due to deficiencies in reactive power generation.

FIG. 1 illustrates a simplified one-line diagram of a topology of an electric power delivery system 20, in accordance with an embodiment. Note that, while the electric power delivery system 20 is described in detail, this is used as an example and any suitable topology that monitors bus voltages and branch flows may use the perturbation-based load shedding monitoring and control systems described herein.

The electric power delivery system 20 may include microgrids 22 and 24 connected to a power grid 26 (i.e., macrogrid). The microgrid 22 may include generators 30 and 32 and loads 34, 36, and 38 connected to a bus 40. The bus 40 may electrically couple the microgrid 22 to the power grid 26 via a transformer 42 and power line 43. The generators 30 and 32 may be connected to the voltage bus 40 through respective circuit breakers 44 and 46, and the loads 34 and 36 may be connected to the voltage bus 40 through respective circuit breakers 48 and 50. Load 38 may be a nonsheddable load that does not include a circuit breaker, which prevents load 38 from being selectively shed.

Similarly, the microgrid 24 may include a generator 54 and loads 56, 58, and 60 connected to a bus 62. The bus 62 may be electrically connected to the power grid via the transformer 64 and power line 66. The generator 54 may be connected to the bus 62 through a circuit breaker 68, and the loads 56 and 58 may be connected to the bus 62 through respective circuit breakers 70 and 72 with load 60 being a nonsheddable load. The power grid 26 may include various loads 76 and 78 at substations as well.

The electric power delivery system 20 may include intelligent electronic devices (IEDs), such as relays 80, 82, 84, 86, 88, 90, and 92 that are communicatively coupled to respective circuit breakers 44, 46, 48, 50, 68, 70, and 72. As used herein, an IED may refer to any microprocessor-based device that monitors, controls, automates, and/or protects monitored equipment within system the electric power delivery system 20. Such devices may include, for example, remote terminal units, differential relays, distance relays, directional relays, feeder relays, overcurrent relays, voltage regulator controls, voltage relays, breaker failure relays, generator relays, motor relays, faulted circuit indicators, automation controllers, bay controllers, meters, recloser controls, communications processors, computing platforms, programmable logic controllers (PLCs), programmable automation controllers, input and output modules, digital sample publishing units, merging units, and the like. The term IED may be used to describe an individual IED or a system comprising multiple IEDs. The IEDs may include sensors, such as potential transformers, current transformers, that detect electrical characteristics of the electric power delivery system 20. For example, the relays 80, 82, 84, 86, 88, 90, and 92 may be communicatively coupled to respective current transformers (CTs) 100, 102, 104, 106, 108, 110, and 112 to receive current measurements of the electric power delivery system 20 and may control operation of the circuit breakers 44, 46, 48, 50, 68, 70, and 72 based on the current measurements. For example, during overcurrent conditions, the relay 84 may send a signal to trip the circuit breaker to disconnect the load from the bus 40.

Additionally, relays 120 and 122 may be used to receive current signals from the respective current transformers 124 and 126 to control circuit breakers 127 and 128. In this example, the relays 120 and 122 may monitor power flow between the buses 40 and 62 to other buses in the power grid 26.

Further, a monitoring and control system 130 may be used to monitor and control the electric power delivery system 20. The monitoring and control system 130 may receive one or more electrical measurements from various monitoring devices in the electric power delivery system 20. For example, the monitoring and control system 130 may receive voltage measurements of the buses 40 and 62 (e.g., from the relays 84 and 90 via respective potential transformers 111 and 113) and power flow measurements of the power lines 43 and 66 (e.g., via relays 120 and 122) to control the power delivery system 20. For instance, the monitoring and control system 130 may send control signals to controllers of the generators 30, 32, and 54 and/or to the relays to control various aspects of the power delivery system 20.

During operation, a contingency may occur on the electric power delivery system 20 that causes a change in the state of the electric power delivery system 20, also referred to as perturbation. Some monitoring and control systems 130 may address the contingency by controlling the electric power delivery system 20 based on active power. For example, if the circuit breaker 68 is tripped and the generator 54 is disconnected from the bus 62, then the monitoring and control system 130 may balance the active power generated from the remaining generators with active power consumed by the loads. In the illustrated example, to balance the loss of 10 MegaWatts (MW) from generator 54, the incremental reserve margin (IRM) from generators 30 and 32 may be used (4 MW). To account for the remaining 6 MW, the monitoring and control system 130 may send signals to various relays to shed 6 MW of load, thereby balancing the active power consumed with the active power generated. For instance, the loads may be shed in based on priority.

However, active power load shedding systems may not account for changes in reactive power due to the contingency. In the illustrated example, when generator 54 is disconnected, the electric power delivery system 20 also loses 5 MVAR of generation. If the reactive power produced does not meet the reactive power demanded when shedding the loads, one or more voltages of buses (e.g., bus 62) in the electric power delivery system 20 may decrease (e.g., collapse) below desired operating limits. As such, there is a need in the field to shed load based on both active power and reactive power when there is insufficient reactive power generation for the demand, for example, following an occurrence of a contingency that resulted in loss of reactive power generation.

In the illustrated embodiment, the monitoring and control system 130 may send control signal(s) to shed one or more loads in the electric power delivery system 20 based on the perturbation of active power and reactive power due to the contingency. By determining perturbation of active power and reactive power in the electric power delivery system 20, the loads may be shed to meet the constraints of the electric power delivery system 20 in a robust and reliable manner. Further, some embodiments of the monitoring and control system 130 may linearize optimal power flow equations to quickly determine which loads to shed within a period of time (e.g., within 1 millisecond, 2 milliseconds, 4 milliseconds, etc.). Further, by using the perturbation of active power and reactive power to determine which loads to shed, systems and methods described below may be performed without requiring measurements of nonsheddable loads, such as loads 38 and 60. That is, because the monitoring and control system 130 is shedding loads based on changes in the state of the electric power delivery system 20 and nonsheddable loads are unchanged, systems and methods described herein may use perturbation of active power and reactive power to reliably shed loads without measurements from the nonsheddable loads.

Figure 2:
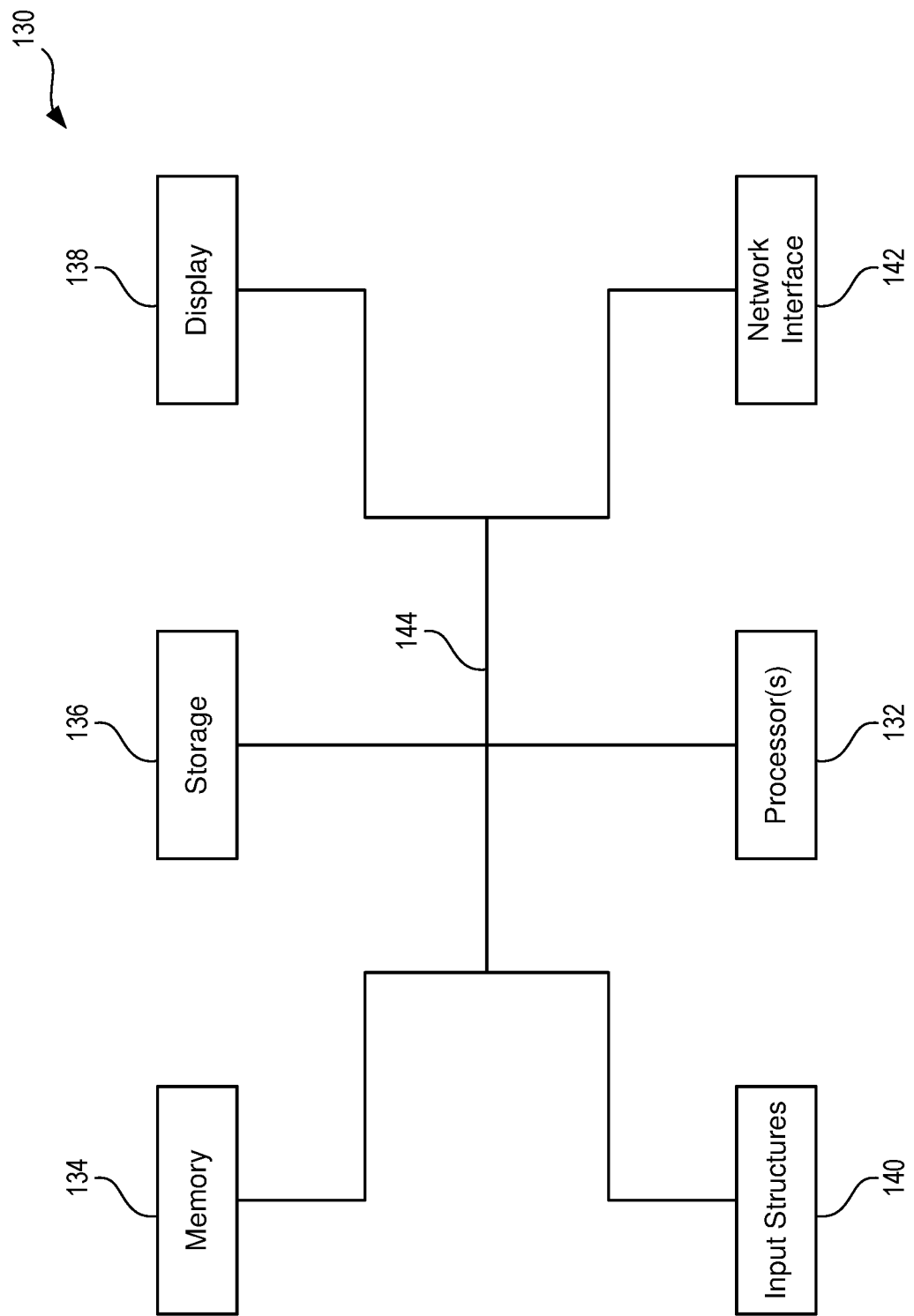
FIG. 2 is a block diagram of the monitoring and control system of FIG. 1, in accordance with an embodiment.

FIG. 2 is a block diagram of the monitoring and control system 130 that may be used to monitor and control the electric power delivery system 20 based on perturbation of active power and reactive power. The monitoring and control system 130 may be located at any suitable location, such as at a power plant of the electrical power delivery system 20 or at another facility. The monitoring and control system 130 may include one or more electronic device(s) according to an embodiment of the present disclosure, which may include, among other things, one or more processor(s) 132, memory 134, nonvolatile storage 136, a display 138, input structures 140, and network interface 142. The various functional blocks shown in FIG. 2 may include hardware elements (including circuitry), software elements (including computer code stored on a computer-readable medium) or a combination of both hardware and software elements. It should be noted that FIG. 2 is merely one example of a particular implementation and is intended to illustrate the types of components that may be present in the monitoring and control system 130. The processor 132 may be a single contained processing module or may be incorporated wholly or partially within any of the other elements within the monitoring and control system 130.

In the monitoring and control system 130 of FIG. 2, the processor 132 may be operably coupled, via one or more communication buses 144, with the memory 134 and/or the nonvolatile storage 136 to perform various algorithms. Such programs or instructions executed by the processor 132 may be stored in any suitable article of manufacture that includes one or more tangible, computer-readable media at least collectively storing the instructions or routines, such as the memory 134 and the nonvolatile storage 136. The memory 134 and the nonvolatile storage 136 may include any suitable articles of manufacture for storing data and executable instructions, such as random-access memory, read-only memory, rewritable flash memory, hard drives, and optical discs. In some embodiments, the nonvolatile storage 136 and/or the processor 132 may be implemented as hardware components, such as via discrete electrical components, via a field programmable gate array (FPGA), and/or via one or more application specific integrated circuits (ASICs) and may be referred to generally as processing circuitry. Further, the instructions or routines may be provided to the processor 132 to produce a machine, such that the instructions, when executed by the processor 132, implement the operations/acts specified in the flowchart described below with respect to FIG. 4.

The input structures 140 may enable a user to interact with the monitoring and control system 130 via the display 138. The display 138 may be any suitable display that allows users to view images generated on the monitoring and control system 130, such as a liquid crystal display (LCD), organic light emitting diode (OLED) display, or the like.

According to various embodiments, the monitoring and control system 130 may comprise one or more of a variety of types of systems, such as a supervisory control and data acquisition (SCADA) system, and/or a power management system (PMS), and/or a wide area control and situational awareness (WACSA) system. The monitoring and control system 130 may provide control operations for the power delivery system 20. In some embodiments, IEDs may be in communication with the monitoring and control system 130 over various media such as a direct communication or over a wide-area communications network. The network interface 142 may include, for example, communication circuitry suitable to communicate wirelessly with the IEDs. The monitoring and control system 130 may receive signal(s) from one or more of the power generators 30, 32, and 54, one or more of the loads, and/or one or more other electronic devices, such as one or more IEDs (e.g., relays 80, 82, 84, 86, 88, 90, 92, 120, and 122), on the power delivery system 20.

To determine perturbation of active power and reactive power in the electric power delivery system 20, the monitoring and control system 130 may use perturbation equations derived from the steady state power flow model. The steady state power flow equations may be stated as:

$$P_k = V_k \sum_{m \in S} V_m (G_{km}\cos\delta_{km} + B_{km}\sin\delta_{km}) \quad \text{Eq. 1}$$

$$Q_k = V_k \sum_{m \in S} V_m (G_{km}\sin\delta_{km} - B_{km}\cos\delta_{km}) \quad \text{Eq. 2}$$

where $P_k$ and $Q_k$ are active and reactive power injected into node k, $V_k$ and $V_m$ are voltage magnitudes at buses k and m, S is the set of the buses in the system, $\delta_{km} = \delta_k - \delta_m$ where $\delta_k$ and $\delta_m$ are the voltage angles of bus k and bus m, and $G_{km}$ and $B_{km}$ are the active and reactive part of $Y_{km}$, the (k, m)th element of the bus admittance matrix. From the steady state power flow equation, the perturbation (e.g., change between pre-contingency steady state power flow to post-contingency steady state power flow) of active power ($\Delta P_k$) and reactive power ($\Delta Q_k$) may be expressed as:

$$\Delta P_k \approx \sum_{m \in S}(-B_{km}\Delta\delta_m + G_{km}\Delta V_m) + \Delta\delta_k b_{kk} + \quad \text{Eq. 3}$$

$$\Delta V_k g_{kk} - \sum_{m \in S} G_{km}\delta_{km}\Delta\delta_{km} - \frac{1}{2}\sum_{m \in S} G_{km}\Delta\delta_{km}^2$$

-continued $$\Delta Q_k \approx \sum_{m \in S}(-G_{km}\Delta\delta_m - B_{km}\Delta V_m) + \Delta\delta_k g_{kk} - \quad \text{Eq. 4}$$

$$\Delta V_k b_{kk} + \sum_{m \in S} B_{km}\delta_{km}\Delta\delta_{km} + \frac{1}{2}\sum_{m \in S} B_{km}\Delta\delta_{km}^2 \quad 5$$

where $\Delta\delta_{km} = \Delta\delta_k - \Delta\delta_m$, where $\Delta\delta_m$ and $\Delta\delta_k$ are the changes in the voltage angle of bus m and k (from the pre-contingency steady state to after the contingency), $g_{kk}$ and $b_{kk}$ are the active and reactive part of the $k^{th}$ diagonal element in the $Y_{bus}$ matrix, and $\Delta V_k$ and $\Delta V_m$ is the change in the voltage magnitude of bus m and bus k (from the pre-contingency steady state to after the contingency). The last term ($\Delta\delta_{km}^2$) in equations (3) and (4) are in quadratic form. To linearize the last term, piecewise linearization may be used.

Figure 3:
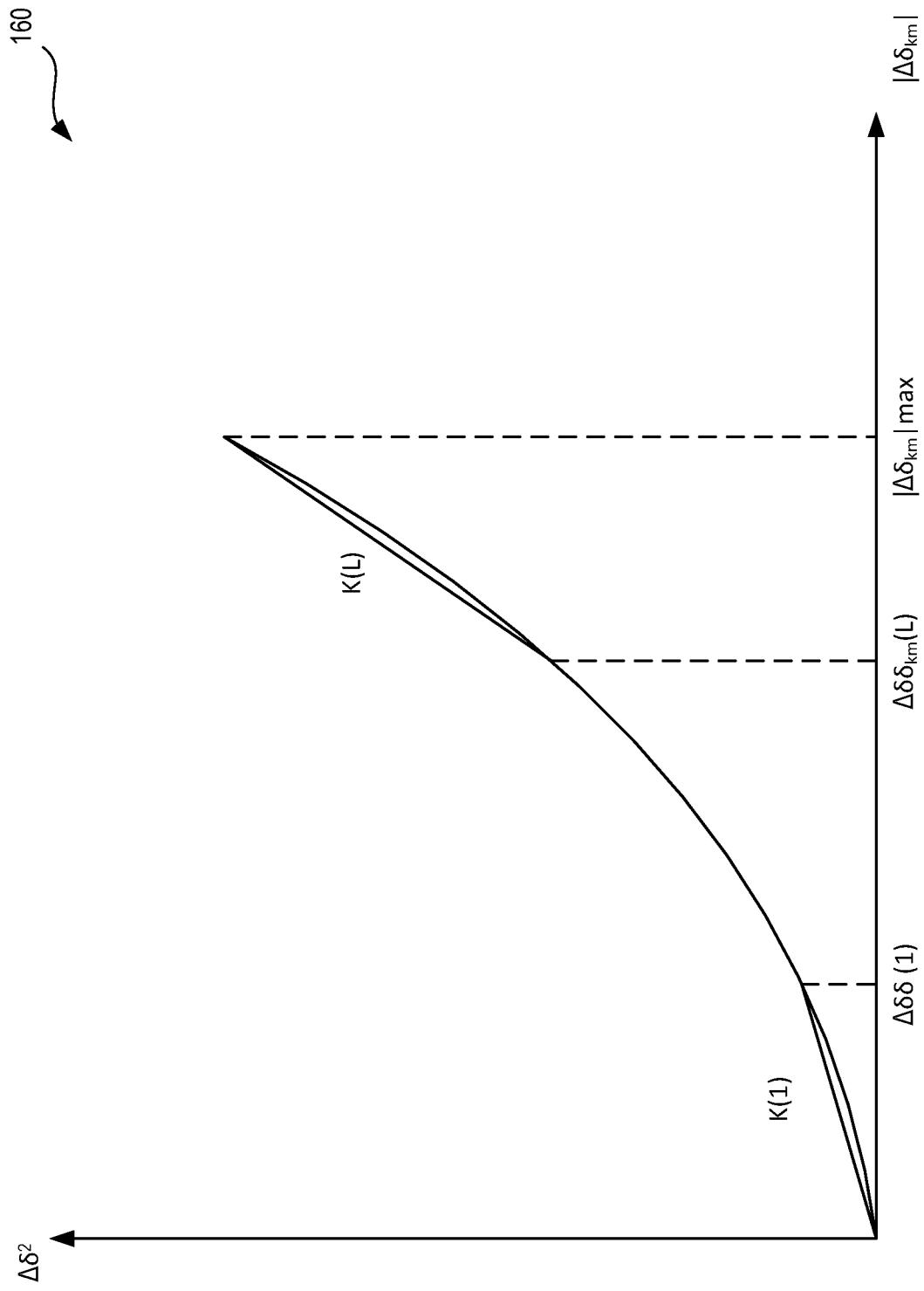
FIG. 3 is a plot of a linearization of changes in phase angle differences between voltages of buses in the electric power delivery system of FIG. 1, in accordance with an embodiment.

FIG. 3 is a plot of a linearization of $\Delta\delta_{km}^2$ with respect to $|\Delta\delta_{km}|$ using L linear segments, in accordance with an embodiment. k(i) is the slope of the $i^{th}$ segment. $|\Delta\delta_{km}|_{max}$ is a constant describing the maximum angle difference between two adjacent buses and may be determined using any suitable known method (e.g., user input, calculation, etc.). Therefore, the expression of $\Delta\delta_{km}^2$ is:

$$\Delta\delta_{km}^2 = \sum_{i=1}^{L} k(i)\Delta\delta_{km}(i) \quad \text{Eq. 5}$$

where k(i) is given by the expression:

$$k(i) = (2i-1)\frac{|\Delta\delta_{km}|_{max}}{L} \quad \text{Eq. 6}$$

Further, $\Delta\delta\delta_{km}(i)$ satisfies:

$$|\Delta\delta_{km}| = \sum_{i=1}^{L} \Delta\delta\delta_{km}(i) \quad \text{Eq. 7}$$

As any given $\Delta\delta\delta_{km}(i)$ is less than or equal to the maximum length:

$$0 \leq \Delta\delta\delta_{km}(i) \leq \frac{|\delta_{km}|_{max}}{L} \quad \text{Eq. 8}$$

To establish the relationship between $\Delta\delta_{km}$ and $|\Delta\delta_{km}|$ that accounts for the absolute value (e.g., from the positive side ($\Delta\delta^+_{km}$) and the negative side ($\Delta\delta^-_{km}$)), two non-negative variables $\Delta\delta^+_{km}$ and $\Delta\delta^-_{km}$, are created and defined as:

$$\Delta\delta_{km} = \Delta\delta^+_{km} - \Delta\delta^-_{km} \quad \text{Eq. 9}$$

$$|\Delta\delta_{km}| = \Delta\delta^+_{km} + \Delta\delta^-_{km} \quad \text{Eq. 10}$$

where $\Delta\delta^+_{km} \geq 0$ and $\Delta\delta^-_{km} \geq 0$.

Hence, the perturbation based power flow equations may be expressed as:

$$\Delta P_k \approx \sum_{m \in S}(-B_{km}\Delta\delta_m + G_{km}\Delta V_m) + \Delta\delta_k b_{kk} + \quad \text{Eq. 11}$$

$$\Delta V_k g_{kk} - \sum_{m \in S} G_{km}\delta_{km}\Delta\delta_{km} - \frac{1}{2}\sum_{m \in S}\sum_{i=1}^{L} G_{km}k(i)\Delta\delta\delta_{km}(i)$$

$$\Delta Q_k \approx \sum_{m \in S}(-G_{km}\Delta\delta_m - B_{km}\Delta V_m) + \Delta\delta_k g_{kk} - \quad \text{Eq. 12}$$

$$\Delta V_k b_{kk} + \sum_{m \in S} B_{km}\delta_{km}\Delta\delta_{km} + \frac{1}{2}\sum_{m \in S}\sum_{i=1}^{L} B_{km}k(i)\Delta\delta\delta_{km}(i)$$

where $\delta_{km}$ is the phase angle difference between bus k and m prior to the contingency during steady state operation, $\Delta\delta_{km}$ is the phase angle difference between bus k and m due to the perturbation, $\Delta\delta\delta_{km}(i)$ is the $i^{th}$ linearized segment of FIG. 3. Each of the $\Delta\delta\delta_{km}$ values may be calculated online upon occurrence of the contingency.

To quickly and reliably shed load, the monitoring and control system 130 may model the power system using linear optimization to meet the equality constraints above, meet the inequality constraints of equations (8) and (14)-(17), and to minimize an objective function. In the illustrated embodiment, the objective of the model is to minimize the active power load tripped after a contingency with consideration of higher weights on the higher priority loads. The objective function may be defined as:

$$\text{Min:} \sum_{i=1}^{N_L} W_i * PL_i * \text{Brk\_Trip}_i \quad \text{Eq. 13}$$

where $N_L$ is the number of loads in the system, $W_i$ is the weight factor of load i, $PL_i$ is the active power of load i, and $\text{Brk\_Trip}_i$ is the breaker trip status (eg., breaker tripped as 1, breaker not tripped as 0) of load i.

The inequality constraints of the load shedding may include equation (8) and equations (14)-(17) stated as follows:

$$\Delta PG_i^{min} \leq \Delta PG_i \leq \Delta PG_i^{max} \quad \text{Eq. 14}$$

$$\Delta QG_i^{min} \leq \Delta QG_i \leq \Delta QG_i^{max} \quad \text{Eq. 15}$$

$$\Delta V_i^{min} \leq \Delta V_i \leq \Delta V_i^{max} \quad \text{Eq. 16}$$

$$0 \leq \text{Brk\_Trip}_i \leq 1 \quad \text{Eq. 17}$$

where $\Delta PG_i^{min}$ and $\Delta PG_i^{max}$ are lower and upper limits of active power perturbation of generator i, $\Delta QG_i^{min}$ and $\Delta QG_i^{max}$ are lower and upper limits of reactive power perturbation of generator i, $\Delta V_i^{min}$ and $\Delta V_i^{max}$ are lower and upper limits of allowable voltage deviation of bus i, $\Delta PG_i$ and $\Delta QG_i$ are the active and reactive power change of generator i after a contingency, $\Delta V_i$ is bus i voltage magnitude change after a contingency.

The inequality constraints of equations (14)-(17) may be based on inputs received via the input structures 140 of the monitoring and control system 130. For example, the monitoring and control system 130 may receive steady state inequality values of $PG_i^{min}$, $PG_i^{max}$, $QG_i^{min}$, $QG_i^{max}$, $V_i^{max}$, or a combination thereof. For instance, an operator may input desired voltage minimum and maximum values for each of the buses in the electric power delivery system 20, which may then be used to calculate the perturbation values, based on the steady state operation of the electric power delivery system 20. In this example, $\Delta V_i^{min}$ and $\Delta V_i^{max}$ may be determined to be the difference between the assigned $V_i^{min}$ and $V_i^{max}$ of the voltage bus and the present steady state measurements of the voltage bus. Similar calculations may be made for $\Delta PG_i^{min}$, $\Delta PG_i^{max}$, $\Delta QG_i^{min}$ and $\Delta QG_i^{max}$ from input values of operating limits of the generators and the present steady state measurements of the active and reactive power generated by the generators.

Figure 4A:
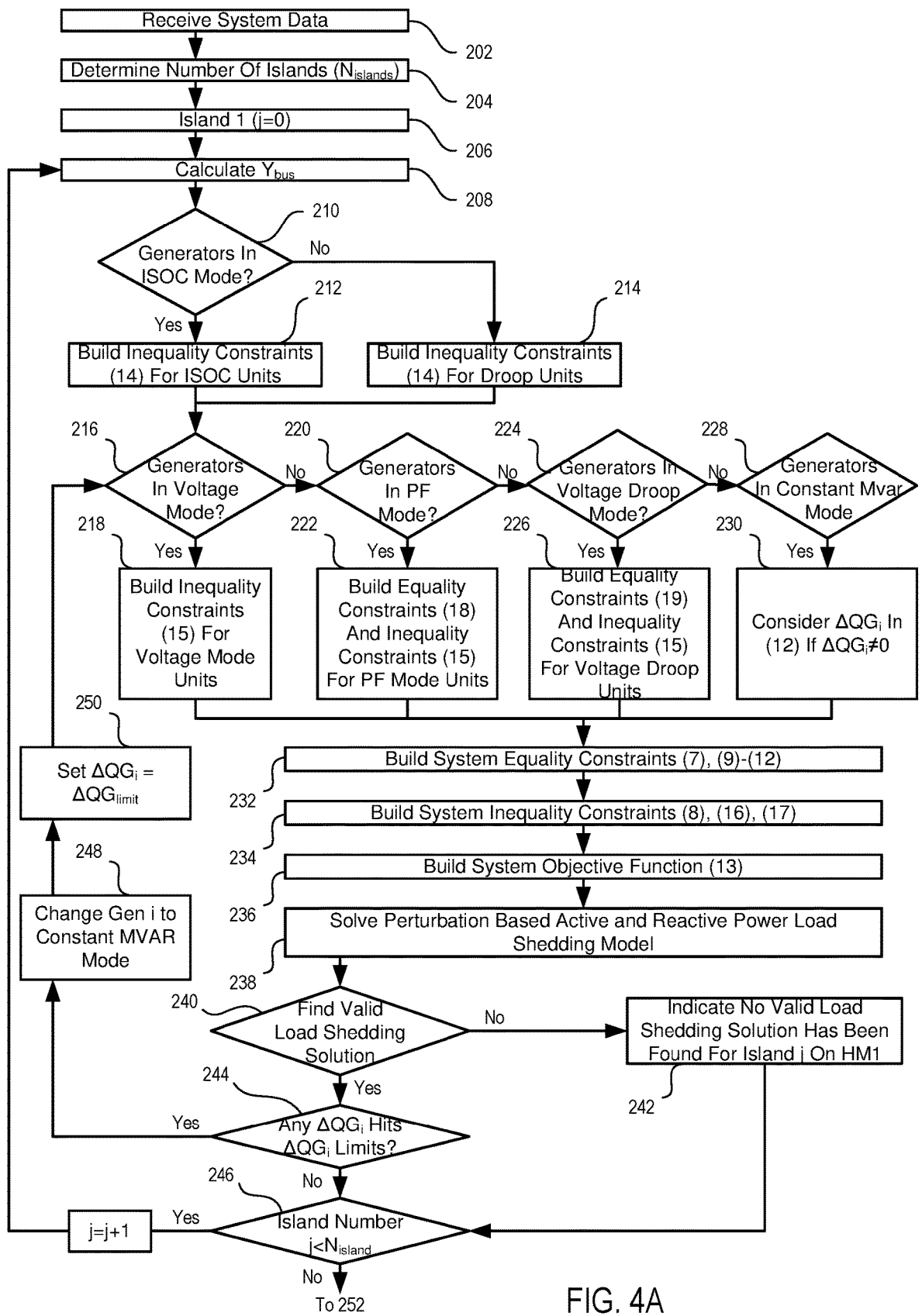
FIG. 4A is a flow diagram of a first part of a process performed by the monitoring and control system of FIG. 1 to shed loads based on perturbation of active power and reactive power, in accordance with an embodiment.
Figure 4B:
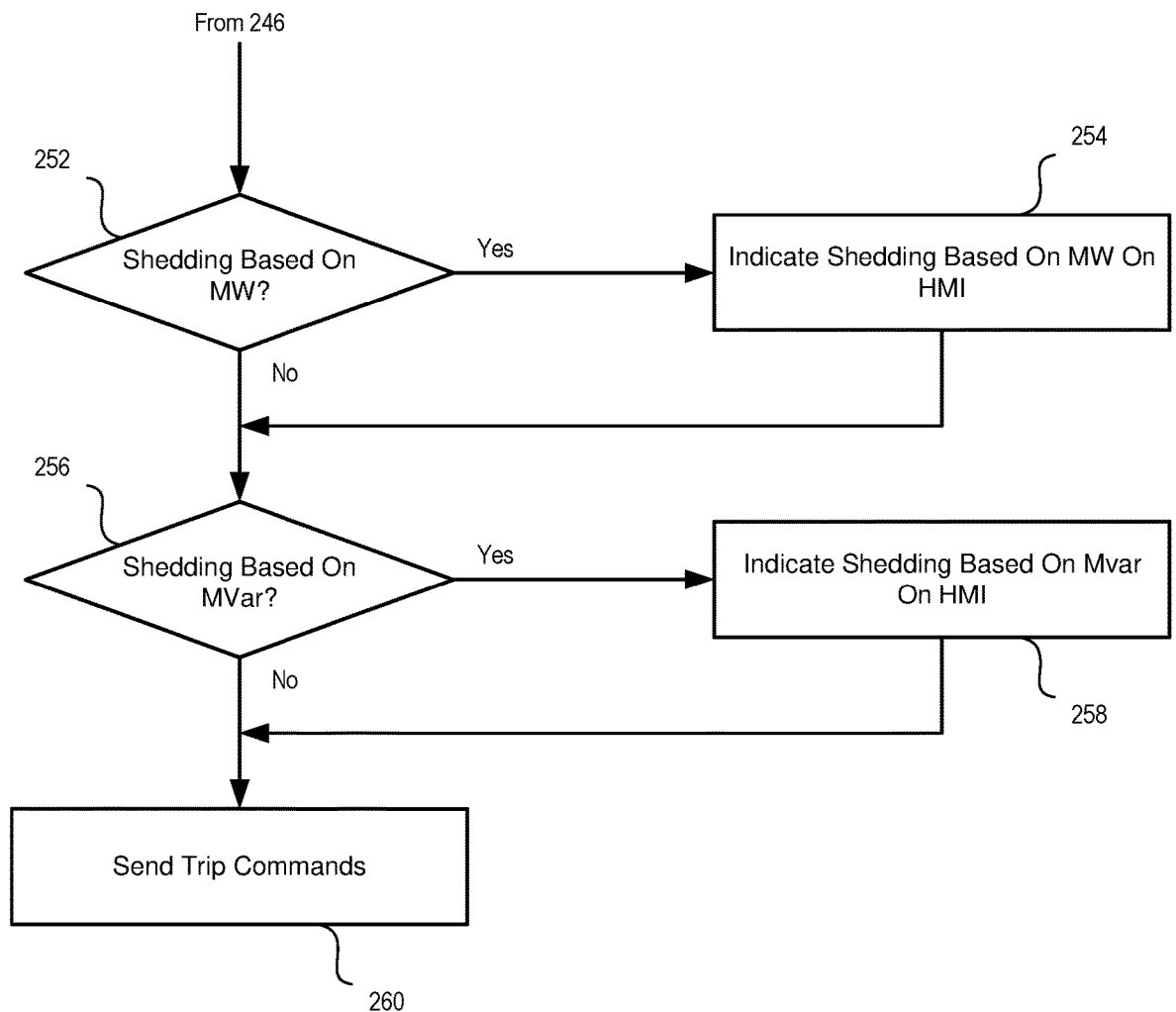
FIG. 4B is a flow diagram of a second part of a process performed by the monitoring and control system of FIG. 1 to shed loads based on perturbation of active power and reactive power, in accordance with an embodiment

FIG. 4A is a flow chart of a process 200 that may be performed by the processor 132 of the monitoring and control system 130 in monitoring and control operations of the electric power delivery system 20. The process 200 may be stored as instructions (e.g., code) in the memory 134 and/or the nonvolatile storage 136 to be executed by the processor 132 perform the operations described therein. The process 200 may begin with the monitoring and control system 130 receiving system data (block 202). The system data may be received via the input structures 140 from user input, via the network interface 142, or any other suitable method. The system data may include topology (e.g., equipment and connections therebetween), breaker status, line impedance, transformer settings bus voltage, generator operating limits, generator operating modes, bus voltage operating limits, active and reactive power of sheddable loads, and the like. Further, the monitoring and control system 130 may receive bus voltage magnitudes of each bus and branch power (MW) flows of each branch between the buses from the various IEDs. In some embodiments, the processor 132 may periodically store pre-contingency steady state power flows of the electric power delivery system 20 in the memory 134 to determine the perturbation values, which, upon detecting a contingency, may be retrieved from the memory 134.

Upon detecting a contingency, the processor 132 may use island tracking logic to determine the number of islands in the power delivery system (block 204). For example, an island may refer to a portion of the electric power delivery system 20 that may provide power (e.g., via a distributed generator) without being tied to the electrical power grid. The process 200 may begin with the first island (block 206). The processor 132 may calculate a $Y_{bus}$ admittance matrix for the first island (block 208). As mentioned above, the $Y_{bus}$ admittance matrix may be a matrix of admittances between each bus in the power delivery system 20 that is used to determine the values of the perturbation power flow equations (11) and (12).

The processor 132 may determine inequality constraints based on the active power mode and the reactive power mode of the generator. For example, the monitoring and control system 130 may receive a status indicating a reactive power mode (e.g., voltage mode, constant MVAR mode, power factor (PF) mode, or voltage droop mode) of the exciter of the generator and a status indicating an active power mode (e.g., isochronous, droop or constant MW) from IEDs monitoring the generators.

With respect to the active power mode, the processor 132 may determine whether generators are operating in isochronous mode (diamond 210). For example, the processor 132 may receive a status signal associated with each of the generators in the electrical power delivery system 20. The status may indicate whether the governor of the generator is operating in isochronous mode, droop mode, constant MW mode, or the like. If there are generators operating in isochronous mode in the electrical power delivery system 20, $\Delta PG_i$ of isochronous machines may be variables constrained by inequality equation (14) (block 212) while active power perturbation of other machines operated in droop mode or constant MW mode may be set to zero and may not need to be considered. If there are no isochronous machines or the isochronous machines are maxed out in the island, the $\Delta PG_i$ of droop generators may be variables constrained by inequality constraint (14) (block 214) while active power perturbation of constant MW mode is zero and may not need to be considered.

The reactive power mode may be another field measured or communicated status that includes whether the generator is operating in voltage mode, constant MVAR mode, power factor (PF) mode, or voltage droop mode. If a generator is operating in voltage mode (diamond 216), the generator terminal voltage perturbation $\Delta V_i$ may be set to zero while $\Delta QG_i$ may be set to a variable that satisfies equation (15) (block 218). If $\Delta QG_i$ reaches $\Delta QG_i^{min}$ or $\Delta QG_i^{max}$, $\Delta QG_i$ may be set to a limit value (e.g., either $\Delta QG_i^{min}$ or $\Delta QG_i^{max}$) and $\Delta V_i$ may become a variable that satisfies equation (16). If a generator is operating in power factor mode (diamond 220), $\Delta QG_i$ may be set to satisfy equality constraint in equation (18) and inequality constraint of equation (15) (block 222).

$$\Delta QG_i = \text{sign}(PF_i) * \Delta PG_i \sqrt{\frac{1}{PF_i^2} - 1} \qquad \text{Eq. 18}$$

where $PF_i$ is the power factor reference value for generator i and $PF_i \neq 0$. If $\Delta QG_i$ reaches $\Delta QG_i^{min}$ or $\Delta QG_i^{max}$, $\Delta QG_i$ may be set to be equal to the constrained limit (e.g., $\Delta QG_i^{min}$ or $\Delta QG_i^{max}$), which may involve removing equality constraint (18) from the set of constraints for the generator.

If a generator is operating in voltage droop mode (diamond 224), $\Delta QG_i$ may be set to satisfy equality constraint in equation (19) and inequality constraint of equation (15) (block 226).

$$\Delta QG_i = -\frac{\Delta V_i}{R_{vdroop}} \qquad \text{Eq. 19}$$

where $R_{vdroop}$ is a droop value of voltage droop control. If $\Delta QG_i$ reaches $\Delta QG_i^{min}$ or $\Delta QG_i^{max}$, the generator may not maintain voltage droop control and $\Delta QG_i$ may be set to be equal to the constrained limit (e.g., $\Delta QG_i^{min}$ or $\Delta QG_i^{max}$), which may involve removing equality constraint (19) from the set of constraints for the generator.

If a generator is operating in constant MVAR mode (diamond 228), $\Delta QG_i$ may be set to zero in the perturbation power flow equation (block 230). For generators that are not operated at constant MVAR mode before the contingency and behave as in constant MVAR mode after the contingency due to reaching reactive power output limits, the $\Delta QG_i$ may be considered in equation (12) if $\Delta QG_i \neq 0$.

Upon determining the constraints from the active power and reactive power operating modes of the generators, the processor 132 may build system equality constraints of equations (7) and (9)-(12) (block 232). For example, the processor 132 may determine the active power and reactive power of each of the buses based on piecewise linearization of the phase angle differences between voltages of each of the buses in the electric power delivery system 20.

The processor 132 may then build system inequality constraints of equations (8), (16), and (17) (block 234). For example, the monitoring and control system 130 may receive voltage settings indicating a desired voltage minimum and maximum of each of the buses in the power delivery system 20 via the input structures 140. Further, the monitoring and control system 130 may limit load breaker tripped status (e.g., whether each breaker is tripped or not) in the range from 0 to 1, where 0 means the load breaker is not tripped and 1 means the load breaker is tripped. Further, the processor 132 may limit $\Delta\,\delta\delta_{km}(i)$ based on user settings, such as $|\Delta\,\delta_{km}|_{max}$ and L. These settings may be, for example, pre-defined during installation of the monitoring and control system 130.

The processor 132 may build the system objective function of equation (13) (block 236). That is, the processor 132 may determine a minimum shedding of loads considering the weight factors of each of the loads. For example, loads of higher priority may be set by the user to have greater weight factors in the objective function.

The processor 132 may then solve the perturbation based active and reactive power load shedding model (block 238) in which the constraints are satisfied to minimize the objective function to account for the contingency in the electric power delivery system 20. That is, the processor 132 may determine a load shedding selection (e.g., a breaker status of each load breaker) in the electric power delivery system 20 that minimizes the weighted shedding of loads while meeting the equality constraints and the inequality constraints. In the example given above with respect to FIG. 1, the minimizing of the objective function may depend on, for example, the perturbation of voltages of the buses as compared to the perturbation voltage constraints, the active power and reactive power operating modes of the generators, the perturbation of active power and reactive power generation of the generators, the generator perturbation limits, the topology, the current breaker status, the line impedance, and the like. By minimizing the objective function, the fewest loads with consideration of priority may be shed without causing voltages of one or more buses to violate voltage constraints due to reactive power deficiencies. If a valid load shedding solution that satisfies the constraints is found (diamond 240), the processor 132 may then proceed to diamond 244. Otherwise, the processor 132 may send a signal indicating that no valid load shedding solution has been found for island j (block 242).

The process 200 may continue by determining if the reactive power $\Delta\,QG_i$ of any generator reaches or exceeds the $\Delta\,QG_i$ limits of equation (15) (diamond 244). If a $\Delta\,QG_i^{max}$ or a $\Delta\,QG_i^{min}$ limit is reached, the processor 132 may reevaluate the active and reactive power load shedding model by changing the generator i to constant MVAR mode (block 248) and setting $\Delta\,QG_i$ to be the $\Delta\,QG_i^{max}$ or $\Delta\,QG_i^{min}$ limit reached (block 250). The steps 216-244 may then be performed with the $\Delta\,QG_i$ set to the constant value. If the $\Delta\,QG_i$ limits are not reached, the steps may then be repeated for each of the remaining islands (diamond 342).

FIG. 5B is a continuation of the process 200 from diamond 246. Upon solving the active and reactive power perturbation load shedding model, the processor 132 may determine whether the loads selected to be shed are based on active power shortage (diamond 252). The processor 132 may indicate, via the display 138, that one or more loads may be shed based on active power shortage (block 254). The processor 132 may determine the loads to be shed are based on reactive power shortage (diamond 256). Further, the processor 132 may indicate, via the display 138, that one or more loads may be shed based on reactive power shortage (block 258). That is, the processor 132 may identify whether the load is being shed based on MW or MVAR balancing.

The processor 132 may send, via the network interface, a signal to one or more IEDs to cause the IED to trip one or more circuit breakers in the electric power delivery system 20 (block 260). For example, the processor 132 may send the trip command via a transceiver of the network interface to a transceiver of the IED to cause the IED to open the circuit breaker to shed the load to match the breaker status of the perturbation based active and reactive power model.

Systems and methods described above may shed loads based on perturbation of both active power and reactive power on each of the buses in the system during a contingency. By shedding loads based on the perturbation of reactive power and active power, the monitoring and control system may perform control operations to prevent voltages in the power delivery system from exceeding or falling below desired operating ranges (e.g., voltage collapses). Further, sufficient the speed and stability of the power system may be achieved for shedding loads based on the active power and reactive power by using linear optimization. For example, the monitoring and control system may determine which loads to shed in one control cycle time (e.g., within 2 ms) or within a limited number of control cycles (e.g., within 4 ms). The linear optimization in the embodiment described above uses a set of constraints and an objective function to minimizes load shed according to active power while considering load priority. Further, the objective function may include the breaker trip condition as a continuous variable; however, the final breaker trip status will be either zero (not trip status) or one (trip status). That is, the load shedding model determined using the objective function described above may allow for tripping or not tripping in the solved active and reactive power load shedding model without solutions that involve partial trips in which some loads on a circuit breaker are tripped without tripping the remaining loads on the circuit breaker. By using linear optimization, the optimal set of circuit breaker states may be determined to balance. Moreover, by determining which loads to shed based on the perturbation of active power and reactive power, the monitoring and control system may account for reactive power in the electric power delivery system without requiring monitoring of nonsheddable loads.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A non-transitory computer readable medium comprising instructions that, when executed by a processor, cause operations comprising:

receiving electrical measurements of a power system prior to a contingency;
detecting the contingency in the power system;
receiving electrical measurements of the power system following the contingency;
determining perturbation of active power and perturbation of reactive power in the power system using the electrical measurements prior to the contingency and the electrical measurements following the contingency in linearized perturbation-based power flow equations of the power system; and
sending a signal to cause one or more sheddable loads of the power system to be shed due to the contingency based on the perturbation of the active power and the perturbation of reactive power to satisfy user defined system frequency and voltage requirements without requiring measurements from nonsheddable loads.

2. The non-transitory computer readable medium of claim 1, comprising instructions that, when executed by a processor, cause operations comprising determining the perturbation of active power and reactive power based at least in part on linearization of a perturbation of phase angle differences between buses of the power system.

3. The non-transitory computer readable medium of claim 1, comprising instructions that, when executed by a processor, cause operations comprising:
obtaining voltages of each bus in the power system;
obtaining power flows of each branch in the power system; and
determining the perturbation of real power and reactive power into each bus in the power system based on the voltages of each bus and the power flows of each branch in the power system.

4. The non-transitory computer readable medium of claim 1, wherein circuit breaker statuses of the one or more sheddable loads are determined based on weights and active power of the one or more sheddable loads.

5. The non-transitory computer readable medium of claim 1, comprising instructions that, when executed by a processor, cause operations comprising:
generating a model of the power system having a set of equality constraints and a set of inequality constraints; and
optimizing the power system according to the model.

6. The non-transitory computer readable medium of claim 5, wherein the set of inequality constraints comprise:

$$\Delta V_i^{min} \leq \Delta V_i \leq \Delta V_i^{max}$$

where $\Delta V_i^{min}$ is a minimum perturbation voltage setting of a bus, $\Delta V_i^{max}$ is a maximum perturbation voltage setting of the bus, and $\Delta V_i$ is a voltage perturbation of the bus.

7. The non-transitory computer readable medium of claim 5, wherein the set of inequality constraints comprise:

$$\Delta PG_i^{min} \leq \Delta PG_i \leq \Delta PG_i^{max}$$

and $$\Delta QG_i^{min} \leq \Delta QG_i \leq \Delta QG_i^{max}$$

where $\Delta PG_i^{min}$ is a minimum perturbation active power of a generator, $\Delta PG_i^{max}$ is a maximum perturbation active power of the generator, $\Delta PG_i$ is an active power perturbation the generator, $\Delta QG_i^{min}$ is a minimum reactive power perturbation of the generator, $\Delta QG_i^{max}$ is a maximum reactive power perturbation of the generator, and $\Delta QG_i$ is a reactive power perturbation of the generator.

8. The non-transitory computer readable medium of claim 1, comprising instructions that, when executed by a processor, cause operations comprising detecting the contingency by receiving a signal indicating a change in topology of the power system.

9. The non-transitory computer readable medium of claim 1, wherein the perturbation of active power and reactive power are determined as:

$$\Delta P_k \approx \sum_{m \in S}(-B_{km}\Delta\delta_m + G_{km}\Delta V_m) + \Delta\delta_k b_{kk} +$$

$$\Delta V_k g_{kk} - \sum_{m \in S} G_{km}\delta_{km}\Delta\delta_{km} - \frac{1}{2}\sum_{m \in S}\sum_{i=1}^{L} G_{km}k(i)\Delta\delta\delta_{km}(i)$$

$$\Delta Q_k \approx \sum_{m \in S}(-G_{km}\Delta\delta_m - B_{km}\Delta V_m) + \Delta\delta_k g_{kk} - \Delta V_k b_{kk} +$$

$$\sum_{m \in S} B_{km}\delta_{km}\Delta\delta_{km} + \frac{1}{2}\sum_{m \in S}\sum_{i=1}^{L} B_{km}k(i)\Delta\delta\delta_{km}(i)$$

where $\Delta P_k$ and $\Delta Q_k$ are the perturbation of active power and the reactive power injected into node k of the power system, $\Delta V_k$ and $\Delta V_m$ is a change in a voltage magnitude of bus m and bus k from the electrical measurements prior to the contingency to following the contingency, $G_{km}$ and $B_{km}$ are an active and a reactive part of $Y_{km}$, a (k, myth element of a bus admittance matrix of the power system, $g_{kk}$ and $b_{kk}$ are the active and reactive part of the $k^{th}$ diagonal element in the bus admittance matrix, $\delta_{km}$ is a phase angle difference between bus k and m prior to the contingency during steady state operation $\Delta\delta_{km}$ is a phase angle difference between bus k and m due to the perturbation, k(i) is a slope of the $i^{th}$ linearized segment segment, and $\Delta\delta\delta_{km}$ (i) is an $i^{th}$ linearized segment of the phase angle difference.

10. The non-transitory computer readable medium of claim 1, wherein the linearized perturbation-based power flow equations comprise a piecewise linearization of changes in voltage angle between electrical measurements prior to the contingency and electrical measurements following the contingency.

11. A system, comprising:
memory; and
a processor operatively coupled to the memory, wherein the processor is configured to:
receive electrical measurements of a power system prior to a contingency;
detect the contingency in the power system;
receiving electrical measurements of the power system following the contingency;
determine perturbation of active power and perturbation of reactive power in the power system using the electrical measurements prior to the contingency and the electrical measurements following the contingency in linearized perturbation-based power flow equations of the power system; and
sending a signal to cause one or more sheddable loads of the power system to be shed due to the contingency based on the perturbation of active power and the perturbation of reactive power without requiring measurements from nonsheddable loads.

12. The system of claim 11, wherein the processor is configured to generate a load shedding model of the power system using a set of equality constraints, a set of inequality constraints, and an objective function to determine which of the one or more loads to shed.

13. The system of claim 12, wherein the processor is configured to minimize load shedding in the power system based on load weight and active power of the load while satisfying the set of equality constraints and the set of inequality constraints.

14. The system of claim 12, wherein the processor is configured to generate the load shedding model using the linearized perturbation-based power flow equations of the power system.

15. The system of claim 14, wherein the processor is configured to determine which of the one or more loads of the power system to shed within two cycles of the electrical measurements of the power system by using the linearization of the perturbations of power flow equations.

16. The system of claim 11, wherein the processor is configured to generate a load shedding model in which each circuit breaker in the power system is modeled as either being in an open position or in a closed position.

17. A method, comprising:
receiving electrical measurements of a power system prior to a contingency;
detecting the contingency in the power system;
receiving electrical measurements of the power system following the contingency;
receiving voltage constraints of a set of buses in the power system;
determining perturbation of active power and perturbation of reactive power in the power system using the electrical measurements prior to the contingency and the electrical measurements following the contingency in linearized perturbation-based power flow equations of the power system; and
sending a signal to trip a circuit breaker to electrically disconnect one or more sheddable loads from the power system based on perturbation of active power and perturbation of reactive power in the power system that satisfies the voltage constraints of the set of buses in the power system without requiring measurements from nonsheddable loads.

18. The method of claim 17, wherein the voltage constraints comprise a minimum voltage limit on each bus in the set of buses, a maximum voltage limit on each bus in the set of buses, or both.

19. The method of claim 17, comprising:
receiving a signal indicating an active power operating mode of a generator;
receiving a signal indicating a reactive power operating mode of the generator; and
generating a load shedding model based on the active power operating mode of the generator and the reactive power operating mode.

20. The method of claim 17, wherein the voltage constraints of the set of buses are received from an operator via input structures of a monitoring and control system.

* * * * *